United States Patent [19]

Kazuta

[11] Patent Number: 4,800,768
[45] Date of Patent: Jan. 31, 1989

[54] POWER TRANSMISSION APPARATUS
[75] Inventor: Bruce H. Kazuta, Burnaby, Canada
[73] Assignee: 4N Developments Ltd., North Vancouver, Canada
[21] Appl. No.: 46,711
[22] Filed: May 7, 1987
[51] Int. Cl.[4] ............................................. F16H 21/42
[52] U.S. Cl. ....................... 74/63; 74/750 B
[58] Field of Search ............... 74/63, 393, 394, 750 B, 74/793; 474/49, 50, 69, 70

[56] References Cited

U.S. PATENT DOCUMENTS

| 1,435,838 | 11/1922 | Gill . | |
|---|---|---|---|
| 2,069,007 | 1/1937 | Fontana . | |
| 2,183,193 | 12/1939 | Husson . | |
| 3,087,355 | 4/1963 | Bassereau . | |
| 3,490,299 | 1/1970 | Binner . | |
| 3,750,485 | 8/1973 | Blakemore . | |
| 3,913,749 | 10/1975 | Wyers . | |
| 3,995,508 | 12/1976 | Newell | 474/50 |
| 4,181,043 | 1/1980 | Waddington | 74/750 B |
| 4,411,165 | 10/1983 | Evans . | |
| 4,475,412 | 10/1984 | Evans | 74/63 |
| 4,665,762 | 5/1987 | Russell | 74/63 |
| 4,701,152 | 10/1987 | Dutil et al. | 474/70 |

FOREIGN PATENT DOCUMENTS

| 625053 | 2/1936 | Fed. Rep. of Germany . | |
|---|---|---|---|
| 437830 | 5/1912 | France . | |
| 527598 | 10/1921 | France . | |
| 766638 | 7/1934 | France . | |
| 282671 | 2/1931 | Italy . | |
| 345007 | 12/1936 | Italy . | |
| 60215 | 7/1924 | Sweden . | |
| 109085 | 11/1943 | Sweden | 474/69 |
| 715863 | 2/1980 | U.S.S.R. . | |

Primary Examiner—Lawrence J. Staab
Attorney, Agent, or Firm—Carver & Co.

[57] ABSTRACT

A transmission means for transmitting power between input and output drives in which a rack and pinion gear assembly and a cam adjacent the pinion cooperate with the drives to provide a variable gear ratio therebetween. The gear assembly includes inner and outer gear rack pairs, in which such gear rack pair has oppositely facing toothed rack portions which are spaced apart sufficiently to receive the pinion gear and cam therebetween, with an outer surface of the cam adjacent at least one of the oppositely facing toothed rack portions. Resilient connectors interconnect the end portions of each pair of toothed rack portions to as to permit limited resilient movement between the rack portions of each pair. A rotor engages the rack pairs to transmit that power therebetween. Preferably, a gear ratio changer can vary spacing between input and output axes in such a direction as to provide a favourable change in effective radius of action of the drive in addition to the gear ratio resulting from the rack and pinion gear assembly.

25 Claims, 5 Drawing Sheets

POWER TRANSMISSION APPARATUS

BACKGROUND OF THE INVENTION

The invention relates to a variable power transmission apparatus in which rotary power of one shaft is transferred to another shaft, with a corresponding change in speed and torque.

Many different types of variable power transmissions are available; some types using trains of journalled gears which cooperate with each other so that speed and torque applied to an input shaft are changed at an output shaft. In some applications, such as a pedal bicycle drive means, a chain loop extends between an input chain wheel, and an output sprocket driving a bicycle wheel. A common form of varying ratio between the chain wheel and output sprocket is to provide a series of sprockets of different sizes, and to shift the chain between the sprockets. A resiliently mounted "jockey wheel" accommodates variations in chain "slackness". This produces incremental changes in output torque and speed of rotation for each sprocket, i.e. there are increments or spaces between adjacent gear settings, but if a wide gear range is required, the increments between adjacent gears tend to be large. If the number of gear settings is to be increased, so as to decrease the spacing between adjacent gear settings, additional complexities are introduced such as multiple chain wheels. Multiple chain wheels usually produce "overlapping" or duplicated gear settings, which reduce effectiveness of the prior art. Furthermore the gear changing mechanism is relatively fragile, and difficult to protect and thus is relatively prone to impact damage. Furthermore, components of the gear changing mechanism are usually exposed to contamination, and it can be difficult to provide adequate lubrication and protection from the elements.

Both types of transmissions described above have distinct increments or "steps" between each gear setting, i.e. they do not provide a continuously variable speed or torque throughout the entire range between upper and lower limits of the gear transmission.

While attempts have been made to produce "stepless" transmissions, that is a transmission apparatus in which speed and torque varies continuously over the entire range, additional complications are usually introduced. While stepless transmissions have the advantage of continuous variation in torque and speed between the input and output limits, usually the range of gear ratios is relatively limited compared with the conventional "stepped" transmission as previously described.

On example of a stepless transmission is shown in U.S. Pat. No 4,411,165 issued to Evans in 1983. While this provides a stepless transmission which can be designed to have a relatively wide gear ratio range, mechanical complexity is considerable and its application to a pedal bicycle would be costly.

SUMMARY OF THE INVENTION

The invention reduces some of the difficulties and disadvantages of the prior art by providing a "stepless transmission" which is mechanically relatively simple, and thus can be easily adapted to a conventional bicycle transmission or equivalent. The apparatus can be assembled to fit compactly within a disc which is slightly thicker than a conventional double chain wheel of a bicycle. Thus all moving parts of the transmission means are enclosed within the disc, which facilitates lubrication and protects the transmission from contamination and impact damage. Furthermore, the transmission provides a gear ratio range which is wider than many gear ratios of conventionally geared bicycles, and, using modern materials, can be made relatively lightweight, low cost to manufacture and essentially maintenance free. The apparatus has many applications other than bicycle drive applications.

A power transmission apparatus according to the invention has a body, a pinion gear, a cam means, inner and outer gear rack pairs, resilient connecting means and a rotor. The pinion gear is mounted for rotation about a pinion axis relative to the body. The cam means has curved inner and outer surfaces, and the cam means and the pinion gear are mounted for relative rotation therebetween. Each gear rack pair has oppositely facing toothed rack portions which are spaced apart sufficiently to receive the pinion gear and cam means therebetween when the pinion gear fully engages teeth of at least one of the toothed rack portions, and the outer surface of the cam means is adjacent at least one of the oppositely facing toothed rack portions. The toothed rack portions of each rack pair have oppositely disposed end portions. The resilient connecting means interconnects the end portions of each pair of toothed rack portions, so as to permit limited resilient movement between the rack portions of each rack pair. The rotor is mounted for rotation about a rotor axis and has engaging means for cooperating with the first and second gear rack pairs, so as to transmit power therebetween.

In one embodiment, a pinion shaft is provided to mount the pinion gear for mutual rotation about the pinion axis relative to the body. A cam mounting means cooperates with the pinion shaft and is connected to the cam means so that the inner surface of the cam means is at a predetermined distance from the pinion axis. This is to permit teeth of the pinion gear to clear the inner surface of the cam means during relative rotation therebetween. Preferably, a gear ratio change means is provided for varying spacing between the rotor axis and the pinion axis so as to vary gear ratio between the pinion gear and the rotor. The gear ratio change means cooperates with the rotor and the pinion gear. The change means includes a rotor mounting means which cooperates with the cam mounting means to permit relative movement between the cam mounting means and the rotor member. The rotor is journalled on the rotor mounting means for relative rotation about the rotor axis.

An alternative transmission apparatus of the invention has an input drive means and an output drive means having respective input and output axes of rotation. One of the drive means has a rotor having a radius of action relative to a particular axis of rotation. The transmission apparatus also includes rack and pinion gear means and gear ratio change means. The rack and pinion gear means cooperate with the input and output means to provide a variable gear ratio therebetween. The gear ratio change means can vary spacing between the input axis and the output axis and cooperates with the input means and the output means to cause relative movement therebetween. The relative movement is in such a direction as to provide a favourable change in effective radius of action of the drive means, in addition to the gear ratio resulting from the rack and pinion gear means.

A detailed disclosure following, related to drawings, describes a preferred embodiment of the invention

3 which is capable of expression in structure other than that particularly described and illustrated.

DETAILED DISCLOSURE

FIGS. 1 through 4

A transmission apparatus 10 according to the invention is described with reference to FIGS. 1 and 2 for use on a bicycle to serve as a bicycle variable power transmission means, but clearly the apparatus has many other applications. The apparatus is a substitute for a conventional pedal-driven chain wheel (not shown) of a bicycle, which is journalled at a bottom bracket of a bicycle frame. The bicycle frame has a down tube 12, a seat tube 13, and chainstays 14 and 16 which intersect at a bottom bracket assembly 15. As seen in FIG. 2, the assembly 15 has a crank axle or input shaft 18 journalled in spaced bearing 19 and 20 carried in the assembly 15. Pedal cranks or hanger arms 22 and 23 are secured at outer ends of the axle or input shaft 18.

The apparatus 10 includes an output rotor 25 carrying a chain ring 27 having teeth which engage a bicycle chain 28 to transmit power to a single sprocket, not shown, on the rear wheel. The apparatus thus has an input shaft 18, and an output rotor 25 and provides the means of reducing gear ratio between the input shaft 18 and the output rotor as follows.

Figure 2:
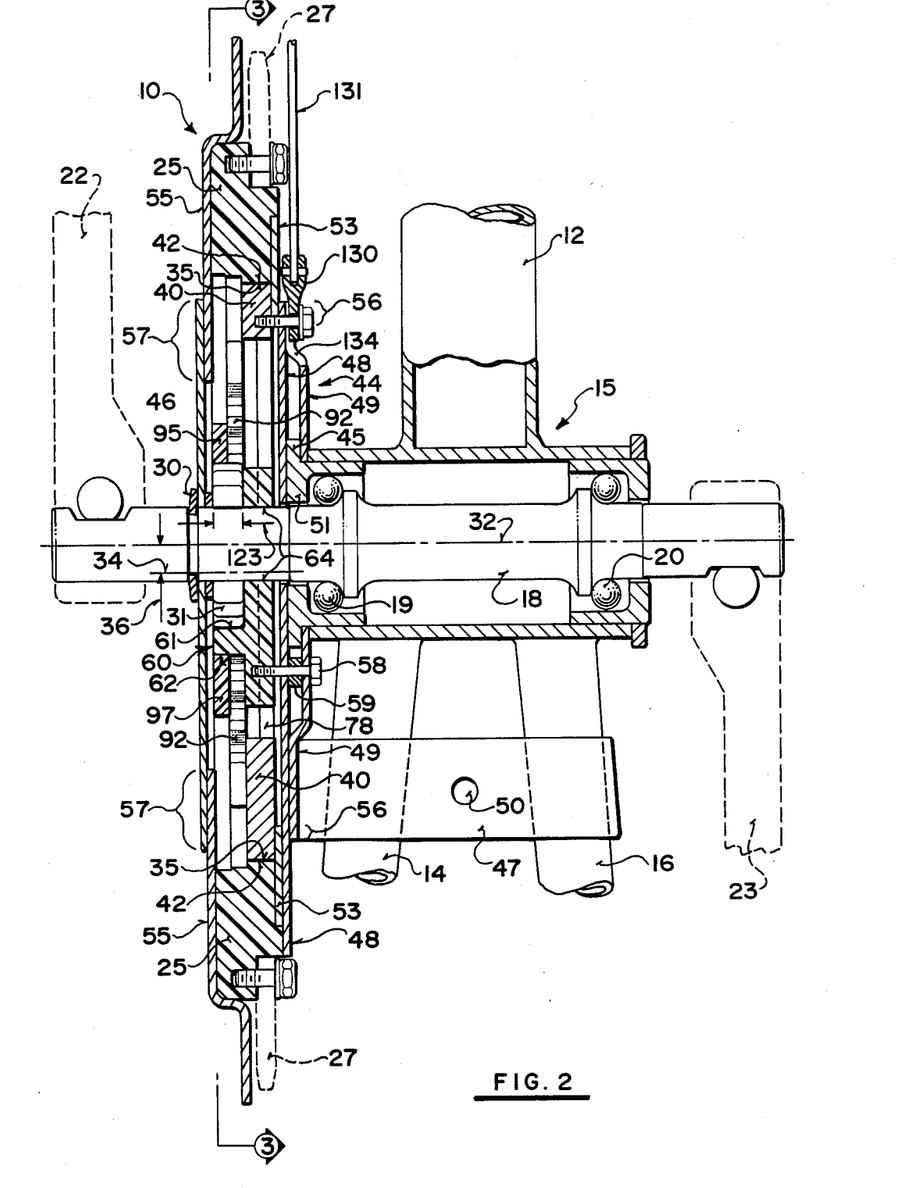
FIG. 2 is a simplified, fragmented diagrammatic section on line 2—2 of FIG. 1, some portions being omitted or repositioned for clarity, the apparatus being shown in the highest gear setting.
Figure 3:
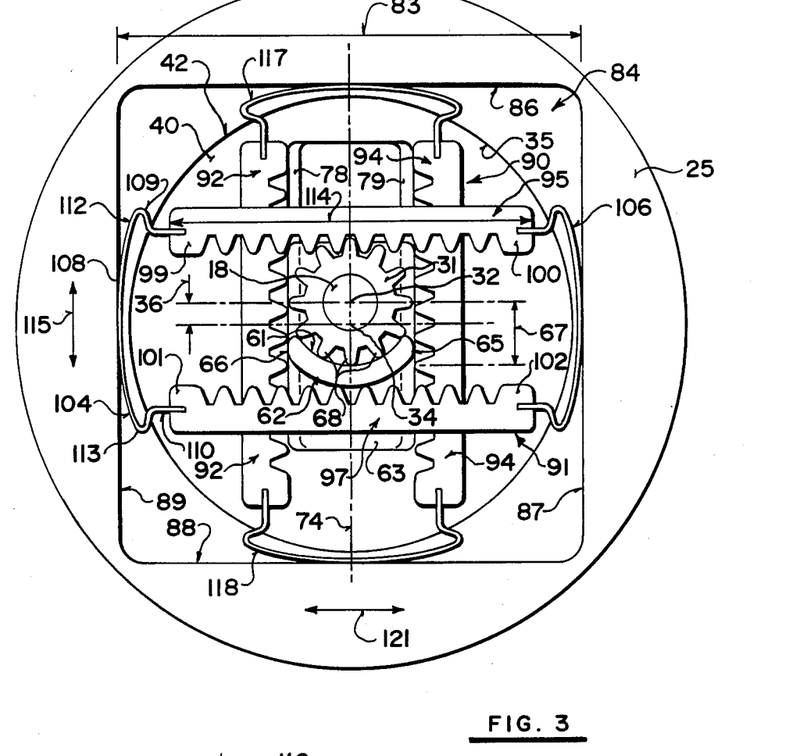
FIG. 3 is a simplified, fragmented, diagrammatic sectional side elevation of the power transmission apparatus as would be seen generally on line 3—3 of FIG. 2, some portions being omitted for clarity, the apparatus being in the highest gear setting.

Referring mainly to the FIGS. 2 and 3, the apparatus 10 has a pinion gear 31 mounted on the input shaft 18 for rotation concurrently therewith about a pinion gear axis 32. A "Woodruff" key, not shown, or other means can be used to prevent rotation between the shaft 18 and the pinion gear. A spring retainer ring 30, engaged in an undesignated annular groove in the shaft 18, prevents axle movement of the apparatus outwardly from the bottom bracket assembly.

The rotor 25 carrying the chain ring 27 is mounted for rotation about a rotor axis 34 which is displaced from the pinion axis by an axis separation 36, which is minimum as shown but can be varied by means which will be described. The rotor 25 has an annular bearing surface 35 which is concentric with the rotor axis 34 and journals the rotor 25 for rotation as will be described. Because the axis 32 of the input shaft 18 is fixed relative to the bicycle frame and is spaced from the axis 34, the rotor always rotates eccentrically relative to the axis 32. Degree of eccentricity of this relative rotation varies in accordance with the geometry of the transmission apparatus 10 as will be described.

The apparatus 10 has a body 38 which includes a rotor mounting means 40 having a rotor bearing surface 42 which is concentric with the rotor axis 34 and is complementary to the annular bearing surface 35 of the rotor for mounting the rotor thereon for rotation about the rotor axis 34. A low friction wear-resisting plastic sleeve, not shown, can be provided to facilitate the said rotation between the rotor 25 and the rotor mounting means 40.

The body 38 also includes stationary inner and outer body sides 44 and 46 respectively which have undesignated aligned central clearance openings to receive the pinion shaft. As best seen in FIG. 2, the inner body side 44 is secured at two places to the frame, namely to the bottom bracket assembly 15 and to the two chain stays 14 and 16 as follows. The body side 44 is an assembly of an inner plate 48 and a dished plate 49 which are secured together by means not shown. A projecting annular rim 45 of a bearing race member 51 of the bottom bracket assembly is sandwiched between the plates 48 and 49. The dished plate 49 has a laterally projecting bracket portion 47 which extends towards the frame and engages lower portions of the chain stays 14 and 16, as best seen in FIGS. 1 and 2. The bracket portion has a central opening 50 which receives a vertical bolt, not shown. A bridge member 43, shown only in broken outline in FIG. 1, extends between opposite portions of the chain stays and has a similar central opening, not shown, to receive the vertical bolt which thus secures the bracket portion and bridge member on opposite surfaces of the chain stays and resist torque reaction.

An annular inner rotor sealing plate 53 is secured to an inner side of the rotor 25 for rotation therewith, and is interposed between an outer portion of the inner body side 44 and the rotor mounting means 40. Similarly, an annular outer rotor sealing plate 55 is secured to the rotor 25 and interposed between the rotor 25 and the outer body side 46. There are sufficient generally annular overlaps 56 and 57 between the rotor sealing plates 53, 55 and the body sides 44, 46 to prevent essentially ingress of dirt and loss of lubricant therethrough. The body sides are stationary and engage outer portions of the rotor 25 to maintain the rotor aligned with the rotor mounting means, thus essentially eliminating "binding" or excessive interference that might otherwise occur due to poor alignment. Also the body sides and rotor permit relative movement therebetween, i.e. orbital sliding movement, as will be described. The inner and outer overlaps 56 and 57 serve as dynamic seal means provided between the body sides and outer portions of the rotor to accommodate the said relative movement. The overlap is not constant and will vary during a revolution of the rotor and thus the body sides and outer portions of the rotor are treated to resist wear from said orbital sliding movement and to prevent loss of lubricant therethrough.

A generally arcuate-shaped cam means 60 has curved inner and outer surfaces 61 and 62 respectively and cam outer portions 65 and 66. The cam means 60 is preferably integral with a cam mounting means 63 which is a generally rectangular plate and has an opening 64 to receive and journal the pinion shaft 18. A bolt 58 passes through undesignated aligned clearance openings in the plates 48 and 49, and has an inner end received in a threaded opening in the cam mounting means 63. An annular spacer 59 is interposed between the plates 48 and 49 to prevent the plates from being drawn together as the bolt 58 is tightened. Clearly, it is important to ensure that the cam mounting means 63 is securely located relative to the body sides to resist forces occurring during pedaling and gear shifting as would be described. The cam mounting means carries the cam means 60 so that the inner surface 61 of the cam means is at a predetermined distance 67 from the pinion axis 32 to permit teeth 68 of the pinion gear 31 to clear the inner surface 61 of the cam means as the pinion gear rotates. It can be seen that the pinion shaft mounts the pinion gear for mutual rotation about the pinion axis relative to the body, and simultaneously relative to the cam mounting means.

Figure 1:
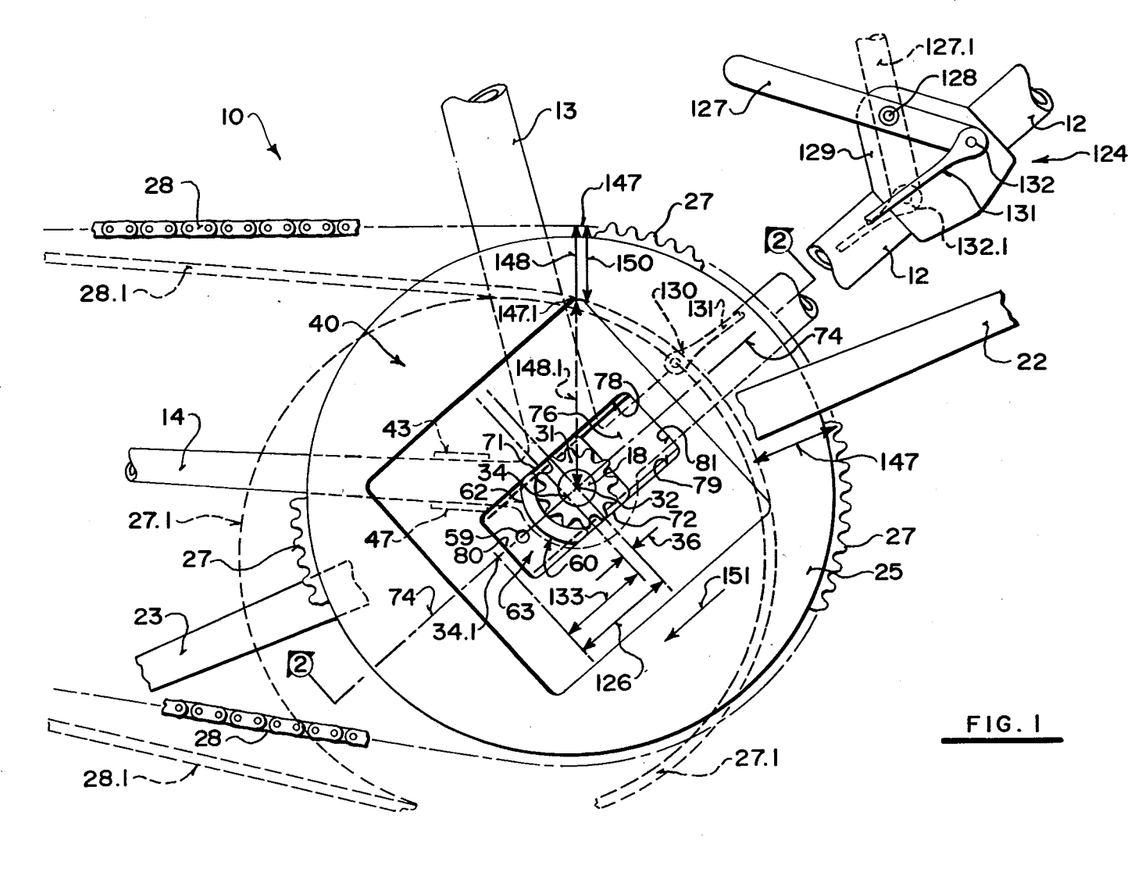
FIG. 1 is a simplified, fragmented diagrammatic side elevation showing an installation of the power transmission apparatus of the invention on portions of a conventional bicycle frame adjacent a bottom bracket structure thereof, the apparatus being shown partially fragmented and at a highest gear setting, that is a minimum reduction between input and output speeds.

Referring to FIG. 1, the cam mounting means 63 has spaced parallel mounting sides 71 and 72 which are disposed parallel to a cam axis 74, which axis passes through the pinion axis 32 and through a centre portion of the cam means 60. The rotor mounting means 40 has an elongated rectangular recess 76 having a pair of spaced parallel recess side walls 78 and 79 and recess end walls 80 and 81. The side walls 78 and 79 engage the mounting side walls 71 and 72 of the cam mounting means to permit relative axial sliding movement therebetween, i.e. between the means 40 and the means 63, along the cam axis 74. Because the rotor axis 34 is fixed relative to the rotor mounting means 40, this movement of the rotor mounting means 40 along the axis 74 varies spacing between the pinion axis 32 and the rotor axis 34. Thus, the rotor mounting means 40 is non-rotatably located relative to the cam means 60 but can move axially relative thereto. The rotor mounting means is mounted for guided movement along the cam axis 74, so that the rotor itself is movable along the radius passing through the pinion axis. The side walls 71, 72, 78 and 79 have complementary guide means to maintain the axial movement within a main plane of the rotor 25.

Referring mainly to FIG. 3, the rotor 25 has a generally square recess 84 defined by four track surfaces 86 through 89. The track surfaces 86 and 88 are spaced apart and parallel to each other and intersect perpendicularly similar track surfaces 87 and 89 which are also spaced apart and parallel to each other. Thus, the four track surfaces are disposed as two pairs of oppositely disposed parallel surfaces of length 83. The length 83 approximately equals diameter of the bearing surface 35, for efficient use of space within the rotor.

The apparatus 10 also includes inner and outer gear rack pairs 90 and 91 respectively. The inner rack pair 90 includes oppositely facing toothed rack portions 92 and 94, and the outer rack pair includes similar oppositely facing toothed rack portions 95 and 97 respectively. As best seen in FIG. 3, the toothed rack portions 95 and 97 are spaced apart sufficiently to receive the pinion gear and cam means therebetween, when the pinion gear fully engages teeth of the rack portion 95 and the outer surface 62 of the cam means 60 is adjacent the oppositely facing toothed rack portion 97.

The toothed rack portion 95 has oppositely disposed end portions 99 and 100, and the toothed rack portion 97 has oppositely disposed end portions 101 and 102. A spring means 104 interconnects opposed end portions 99 and 101, and a similar spring means 106 interconnects opposed end portions 100 and 102. The spring means are resilient connecting means for interconnecting the end portions of each pair of toothed rack portions, so as to define a closed rack assembly and to permit limited resilient movement between the respective rack portions of each pair. The spring means 104 includes a spring central portion 108, and first and second spring end portions 109 and 110 connected to opposed rack end portions 99 and 101. The spring means also includes first and second intermediate spring portions 112 and 113 extending between the respective spring end portion 109 and 110 and the spring central portion 108. The intermediate portions are curved into a "U-shape" or "V-shape" to provide a controlled resilience. The central portion 108 has a flat portion adapted to engage the track surface 89 of the recess 84, so as to permit lateral sliding therealong in directions of an arrow 115. The spring means 106 is generally similar and it can be seen that the two spring means provide a resilient connection between the opposed rack portions and connect the rack portions together to define a closed rack assembly and to permit simultaneous lateral sliding of the rack portions for purposes as will be described.

Figure 4:
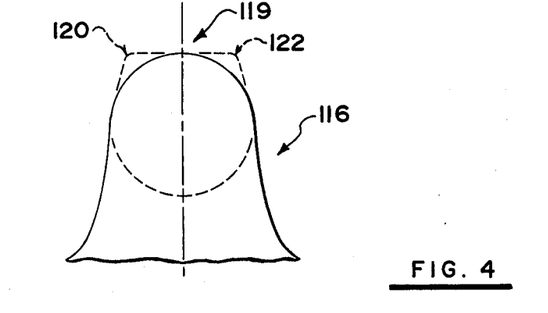
FIG. 4 is a simplified fragmented side elevation of a typical tooth of a rack or pinion of the invention, showing modifications from a conventional involute gear tooth.

The teeth of the rack and pinion are conventional involute teeth, except that outer corners of the teeth have been modified to provide a smoothly radiused tip as seen in FIG. 4. A typical tooth 116 of the pinion or rack has an arcuate tip 119, with corner portions 120 and 122 removed, as shown in broken outline to prevent tip-to-tip seating that might otherwise occur. A theoretical circle is shown in broken outline inscribed within the tip profile for clarity. Furthermore, the rack members are preferably fabricated from a reinforced plastic composite material which is known for its excellent wearing properties, as well as slight resilience and low friction, so as to facilitate drive and engagement of the racks by the pinion, as will be described. One suitable composite material for the rack is a synthetic resin reinforced with KEVLAR TM, as manufactured by DuPont, with the interconnecting spring means being a suitable spring steel. An alternative would be to fabricate the rack portions and the spring means from the same composite material, with a suitable adjustment in shape to provide resilience to facilitate teeth meshing, as will be described.

As shown in FIG. 3, the outer portions 66 and 65 of the cam means contact tips only of teeth of the opposed rack portions 92 and 94 respectively. The cam outer portions 66 and 65 are spaced apart at a distance somewhat greater than diameter of the pinion This spacing is to ensure that the cam outer portion 66 and 65 contact teeth tips of opposed racks, so that the racks are held apart to prevent interference with the pinion, which is rotating therebetween in engagement with another rack portion. Radial width of the cam means is defined as maximum space between cam surfaces 61 and 62, which would be measured usually on the axis 74. Apart from outer portions of the cam surfaces 61 and 62 adjacent the portions 65 and 66, most of the cam surfaces 61 or 62 are circular arcs concentric with pinion axle 32. Thus the radial width of the cam means is essentially constant along most of the cam means. Thus, root diameter of the pinion gear 31, plus the radial width of the cam means 60 plus one tooth depth approximately equals spacing between tips of opposed teeth of rack portions of a rack pair. Radial width of the cam means is critical as it determines, in part, the spacing between rack portions of a pair, and approximates to the minimum spacing 36 between the axes 32 and 34 of the pinion shaft and rotor respectively.

As best seen in FIG. 2, the pinion 31 and cam means 60 have equal thicknesses 123, which is at least twice thickness of a rack portion. Thus, the rack portions are relatively thin, and engage approximately one-half of the width of a tooth of the pinion, and thus are subjected to considerably higher loads than the pinion. The track surfaces 86 through 89 of the rotor mounting means 40 are sufficiently wide to accept two rack portions placed side by side, similarly to the pinion. Consequently, width of the track surfaces and also width of the pinion teeth are approximately twice width of a rack portion, plus necessary clearances.

Referring to FIG. 3, the inner rack pair 90 has inner spring means 117 and 118 which similarly connect opposed end portions of the rack pairs 92 and 94 to function in a similar manner Thus, the spring means 117 and 118 slidingly engage the opposed track surfaces 86 and 88 respectively to permit lateral sliding transverse movement of the rack pair 90 in directions of an arrow 121.

It can be seen that the track surfaces 86 through 89 serve as engagement means for the rotor for cooperating with the first and second gear rack pairs, which function so as to transmit power therebetween as will be described. It can be seen that the gear rack pairs are disposed at right angles to each other so that one rack pair extends between a respective pair of the oppositely disposed track surfaces, with the connecting means of each gear rack pair engaging the adjacent track surface for lateral sliding movement therealong. The length 83 determines space between the track surfaces 87 and 89, which is greater than length 114 of the toothed rack portion 95, so as to permit limited, generally axial movement of the toothed rack portions 95 of the outer rack pair 91 relative to the rotor. Because all toothed rack portions 92, 94, 95 and 97 have equal lengths, and are fitted within a square recess, all rack portions can move axially an equal amount under high loads from the pinion. Normally, due to symmetry of the spring means, when unloaded the rack portions are generally centrally located between opposed track surfaces. However, the rack portions shift in an axial direction, i.e. tangentially, in response to torque loads from the pinion, or also can shift transversely, i.e. radially of the pinion, during transfer of torque between adjacent rack portions as will be described.

It can be seen that the inner and outer body sides 44 and 46 are spaced apart sufficiently to receive the rotor 25, the gear rack pairs 90 and 91, the cam means 60, the mounting means 63, the pinion gear 31, and the rotor mounting means 40 therebetween, as best seen in FIG. 2. Because of the previously described dynamic seals resulting from the overlaps 56 and 57 between stationary and moving parts, the moving parts between the body sides are relatively easy to maintain clean and well lubricated.

As best seen in FIG. 1, the apparatus includes a gear ratio change means 124 for varying spacing or the axis separation 36 between the rotor axis 34 and the pinion axis 32. The gear ratio change means 124 cooperates with the rotor and pinion gear as follows. As previously described, the rotor mounting means 40 is carried on the cam mounting means 63 to permit relative movement between the cam mounting means and the rotor mounting member. The cam mounting sides 71 and 72 engage the recess side wall 78 and 79 to permit guided movement of the rotor mounting means 40 relative to the cam mounting means along the cam axis 74. This movement shifts the rotor axis laterally relative to the pinion axis so that the pitch circle diameter of the teeth 27 of the rotor moves from full line position shown in FIG. 1 at the minimum axis separation 36, to a broken outline position designated 27.1 in FIG. 1 for a maximum axis separation 126.

Referring to FIG. 1, a gear shift lever 127 is hinged at a hinge point 128 to a lever bracket 129 secured to the bicycle frame downtube 12. A stiff connector rod 131 has one end portion 132 connected to the lever 127, and an opposite end portion 130 connected to the rotor mounting means 40 with an undesignated bolt as seen in FIG. 2. The end 130 and the associated bolt are displaced slightly from the axis 74 to provide additional material of the mounting means for receiving the bolt, while avoiding interference with the rotating sealing plate 53, see FIG. 2. The dished plate 49 is non-circular to provide clearance for this important connection. Note that the view of the end portion 130 in FIG. 2 is not on the line of section line 2—2 of FIG. 1. FIG. 1, the lever and rotor mounting means are shown in full outline in a top gear position, namely minimum reduction of the input speed to the rotor or pinion shaft transmitted to the rotor or chain ring. The lever is also shown in broken outline at 127.1 in a maximum gear reduction position i.e. in a lowest gear, wherein an end of the connector 131 is shown at 132.1, and the rotor axis has been displaced a distance 133 to a broken outline position 34.1. A portion of the connector rod adjacent the end 130 passes through a radially aligned, elongated clearance opening 134 in the inner body side 44 to accommodate movement of the rotor mounting means for the full range of movement as will be described.

OPERATION

The apparatus has been described with reference FIGS. 1 through 3 while in a minimum gear reduction configuration, i.e. in a highest gear configuration for the bicycle operator. The operation of the device is similar for both highest and lowest configurations, and any intermediate gear configurations, and while the description following relates to the lowest gear configuration, it could equally apply to any other gear configuration.

Figure 5:
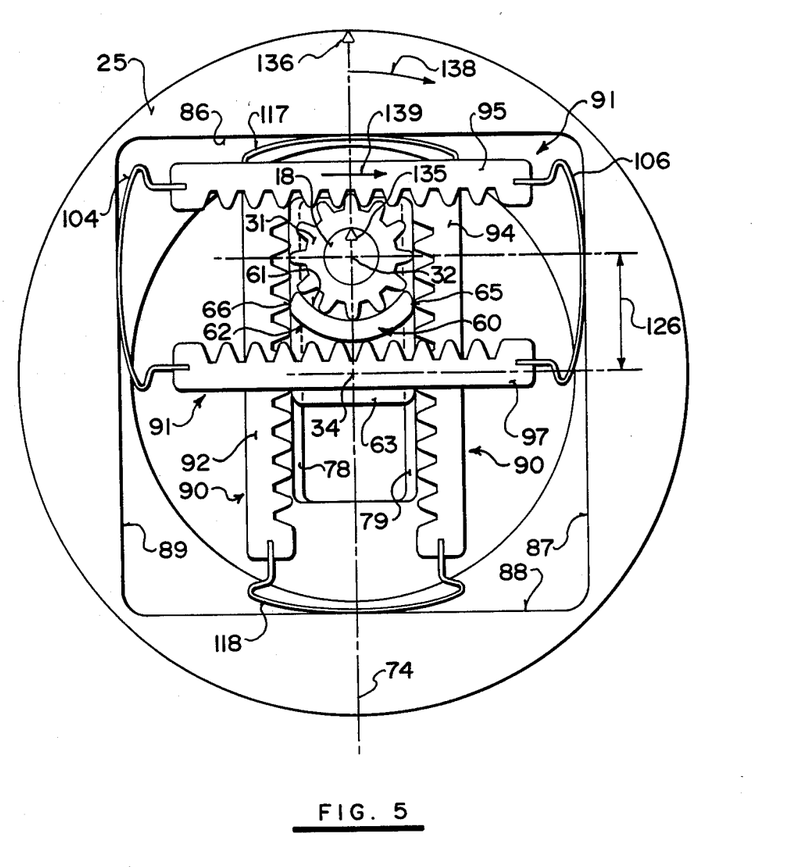
FIG. 5 is a simplified fragmented side elevation of the apparatus, generally similar to the view of FIG. 3, in which the apparatus is shown as a low gear setting, i.e. with a maximum reduction between input and output speeds.
Figure 6:
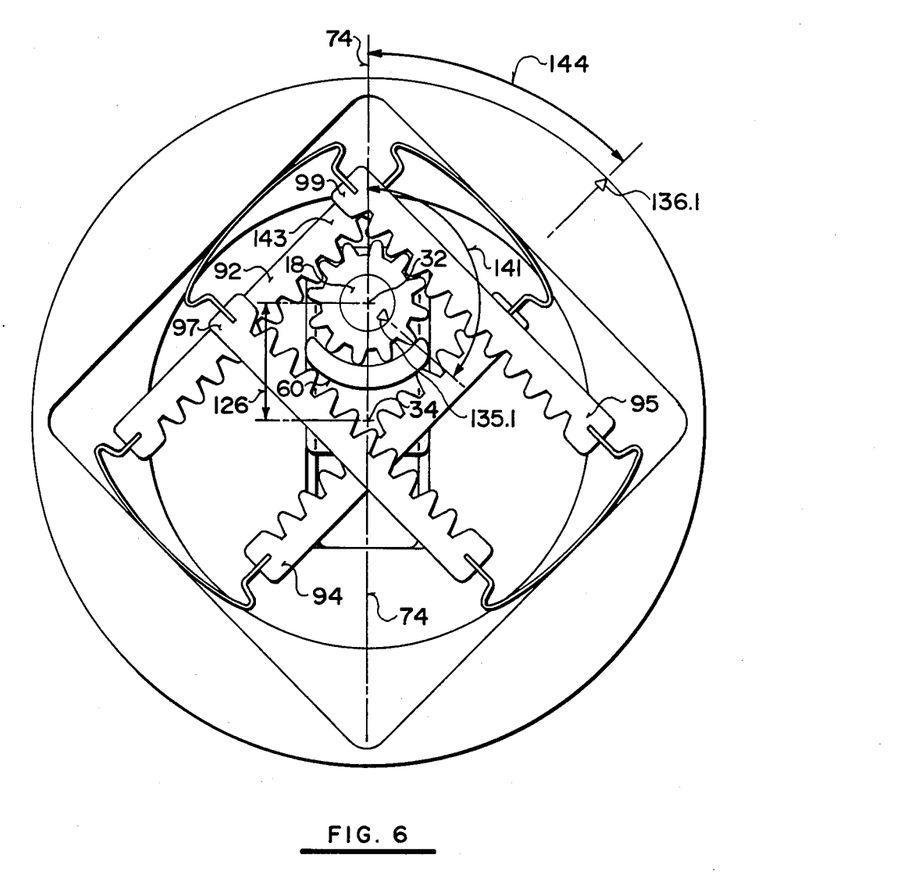
FIG. 6 is a simplified, fragmented side elevation of the apparatus of FIG. 5, shown after rotation of the input, with a corresponding reduced relative rotation of the output.

FIGS. 5 and 6

The axes 32 and 34 of the pinion shaft 18 and the rotor 25 respectively are shown spaced apart at a maximum spacing 126 representing maximum gear reduction, that is the lowest gear configuration for the bicycle operator.

The outer rack pair 91 is thus moved towards the track surface 86 by lateral sliding movement of the spring means 104 and 106 along the track surfaces 89 and 87 respectively. The cam mounting means 63, being fixed, thus guides downwards movement of the rotor mounting means 40, as seen in FIG. 5, so that the rotor axis 34 is now on a side of the cam means 60 remote from the pinion axis 32, i.e. opposite to the position shown in FIG. 2. For illustrative purposes, the pinion shaft 18 has an index mark 135, and the rotor 25 has an index mark 136, the index marks being aligned on the cam axis 74 in FIG. 5, to establish a starting position.

In FIG. 5, the input or pinion shaft 18 is rotated in direction of an arrow 138 from its initial or starting position, which causes the outer rack pair 91 to move in direction of an arrow 139. As the rack 95 rolls on the rotating pinion gear 31, the rotor 25 similarly rotates in direction of the arrow 138 by an amount dependent on the relative ratio between the rack and pinion, the spacing 126 between the pinion and rotor axes 32 and 34, and other parameters. It is noted that the outer surface 62 of the cam means 60 acts as a guide to move the toothed rack portion 97 similarly in a direction of the arrow 139, thus maintaining the rack portions 95 and 97 laterally aligned and generally parallel during this movement. Furthermore, the cam outer portions 66 and 65 contact adjacent teeth of the toothed rack portions 92 and 94 respectively to guide movement of the inner rack pair 90, so as to prevent interference of the rack portions 92 and 94 with the teeth of the pinion.

Referring to FIG. 6, the pinion shaft 18 has rotated through an angle 141, approximately 135 degrees, and the index mark 135 assumes a new position 135.1. In this position, the pinion gear 31 has closely approached the end portion 99 of the rack portion 95, and is now engaging simultaneously a rack end portion 143 of the rack 92 of the inner rack pair. Thus, the pinion gear is simultaneously meshing with adjacent, perpendicularly disposed, rack portions of both the inner and outer rack pairs. Simultaneously, the cam means 60 is contacting the rack portion 97 of the outer rack pair, and the rack portion 94 of the inner rack pair which are also perpendicularly disposed. Thus, the rack pairs which are not engaged by the pinion are held disengaged from the pinion teeth by the cam means. It can be seen that the rotor 25 has rotated through an angle 144, which is approximately 45 degrees depending on the gear ratio, and the index mark 136 has attained a new position 136.1.

Thus, it can be seen that a rotation applied to the input shaft of 135 degrees, results in a rotation of the output or rotor 25 in the amount 45 degrees, which determines the gear ratio of 3:1 between the input and output shaft. It is noted that the relative disposition of the pinion axis 32 and rotor axis 34 has not changed during this rotation. This disposition only changes when there is a change in gear ratio as previously described.

It is noted that, in the position shown in FIG. 6, teeth of the pinion engage both racks. There is thus a period of transfer of power from the pinion to inner rack and then to the outer rack, or conversely to the outer rack and then to the inner rack, when there is an overlap of both rack portions concurrently engaging the pinion. The rounded tips or profile of the rack and pinion teeth, as previously described, facilitates this concurrent engagement, with minimal chance of "binding" or interference between the two rack portions and pinion.

Furthermore, the spring means provide a resilience that permits very limited lateral movement, together with less limited longitudinal movement, relative to the rotor, which limited movements are sufficient to accommodate a smooth transfer of power from one rack to an adjacent rack. Preferably, input power to the input shaft pinion should be reduced during a change of speed, but, in theory, resilience due to the spring means should accommodate this transfer. Clearly, if the input shaft is under high torque during a transfer of power from one rack to an adjacent rack, the said lateral movement of the rack relative to the rotor will be limited by interference between the intermediate portion of the spring means when it contacts the adjacent track surface of the rotor recess. Thus the resilient spring connecting means of each gear rack pair has a flexibility and shape sufficient to permit the limited generally axially movement of each rack portion until interference with an adjacent track surface prevents further axial movement. The adjacent track surface serves as a stop means for limiting the said axial movement of the rack portion. At this stage of interference, when the intermediate portion is considerably distorted from that as shown, the rack is essentially locked relative to the rotor mounting means 40 so there is full transmission of power, with negligible resilience in the rack portion accepting drive from the pinion. The selection of rack portions and gear teeth of composite materials also facilitates this smooth transfer, and reduces chances of "jarring" between components.

The description above clearly shows that the rotor axis 34 shifts relative to the fixed pinion axis 32 during gear changing. It can be shown that strong pedaling forces generate a resultant force on the rotor mounting means 40 which acts along the axis 74 in a direction of an arrow 151, that is in a direction tending to move the rotor mounting means so as to lower the gear, i.e. to increase the axis separation 36. Thus, when pedaling forces are increased, for example, when climbing a hill or accelerating, the movement of the gear shift lever to move the rotor mounting means to lower the gear ratio is assisted by the said resultant force. With a constant gear setting, the rotor axis maintains a particular spacing or eccentricity from the pinion axis. This displacement or eccentricity of rotor axis can have a particular advantage for a bicycle application as follows.

With a conventional bicycle drive mechanism, it is well known that effective application of force from a non-racing cyclist's foot can be maintained for only a relatively short downward sweep of the pedal, typically from a position of about 45 degrees above the horizontal, to about 45 degrees below the horizontal. Consequently, effective application of force to the pedals occurs over approximately 90 degrees of pedal sweep. While this range can be increased considerably by racers using toe clips and other means, it is generally accepted that this is the most effective portion of the full circle of pedal sweep for applying load to the pedals. Shifting of the rotor axis relative to the input axis provides a second means of increasing torque applied by the pedals in addition to the increase already obtained by the reduction in speed obtainable by the rack and pinion mechanism of the invention. This second torque increase is obtained by ensuring that the chain wheel shifts in a direction so as to increase mechanical advantage when applying torque to the pinion, when the pedals are in their most favourable position sweeping through the most effective 90 degrees as described above.

Referring to FIG. 1, it is seen that the rotor chain ring 27 moves in direction of the arrow 151 from the full outline position 27 in the highest gear, to the broken outline position 27.1 in the lowest gear. This movement causes a radial shift of the chain ring 27 relative to the pinion axis, thus effectively reducing "diameter" of the chain ring where the chain 28 initially engages the chain wheel at a point of contact 147. As can be seen from FIG. 1, in the highest gear position the effective radius of the chain ring 27 at the point of contact 147 is designated 148. In the lowest gear position, the effective radius of the chain ring 27.1 at the shifted point of contact 147.1 is designated 148.1. There is thus a decrease 150 in the effective radius of the chain ring at the point of contact with the chain. The "moment of force" exerted by tension in the chain on the rotor 25 (or chain ring 27) is the mathematical product of the force in the chain multiplied by the moment arm. The moment arm is the perpendicular distance (148, 148.1) from the line of action, which is the chain as a tangent to the chain ring, to the fulcrum, which is the pinion axis 32. Clearly, a reduction in the moment arm produces an increase in output torque (or force) available at the periphery of the rotor 25 (or chain ring 27). Thus, the decrease 150 increases mechanical advantage for applying load to the chain 28, which produces yet a further reduction in effective gear ratio, i.e. an increase in torque, when compared with a concentric chain ring as would normally be found in prior art.

As described, the gear shift connector rod 131 is shown extending generally along the down tube 12 which causes a shift of the chain ring along that axis, that is along the axis 74, which is in a favourable position for application of maximum force to the chain wheel from the pedal cranks. Clearly, the direction of shift of the rotor mounting means relative to the pinion axis could be changed, that is the axis 74 could be aligned with the seat tube 13, or other intermediate positions to optimize application of force to the chain ring. However, it should be noted that the shifting of the chain ring to obtain the lower gear ratio as described results in a lowering of a lowermost portion of the chain ring, which could increase chances of interferences of the lowermost portion of the chain ring with obstructions on the road surface. This could be particularly aggravated if the bicycle were riding on unpaved road surfaces, such as mountain trails.

From the above, it can be seen that the gear ratio change means cooperates with the input means and the output means to cause relative movement therebetween in such a direction as to provide a favourable change in effective radius of action of the drive means. This is in addition to the gear ratio resulting from the rack and pinion gear means. In the example described, the rack and pinion gear means are positioned by the gear ratio change means in a low gear configuration in which speed of rotation of the input means is greater than speed of rotation of the output means, with a corresponding increase in the torque at the output means. In this application, the output drive means is an output rotor having a rotor radius relative to the rotor axis, that is the normal concentric axis of the rotor of a circular rotor. The gear shift means of the invention reduces the effective radius of action of the output rotor relative to the input axis to a radius less than the rotor axis relative to the output axis. In other words, the effective radius 148 at the point of contact 147 of the chain with the chain wheel is less than the true radius of the rotor, which increases torque of the output, that is load on the chain 28. Thus, the torque increase due to the gear change means acts in concert with the torque increase due to the reduction in the effective radius of action.

ALTERNATIVES

Clearly, the above selection of relative movement between the input and output axes described above can be reversed to and act in a direction which is unfavourable to the reduction in speed and increase in torque. In this alternative, torque would be reduced and speed correspondingly increased which may have particular advantages in some applications. Alternatively, if the input and output means were reversed, that is if an input force were applied to the rotor 25 so that the gear transmission produces a speed increase on the output shaft, clearly the gear shift means could operate to produce a further increase in speed of rotation of the output means.

The present invention is shown for use in a bicycle transmission, in which the input shaft or pinion shaft 18 rotates relative to a fixed body of the apparatus. In this configuration the rotor 25 has a speed reduction from that of the input shaft, with a corresponding increase in output torque relative to input torque. Clearly, the input and outputs could be reversed, so that input torque instead is applied to the rotor 25 and output torque is extracted from the shaft 18. Also, with some arrangements it might be desirable to rotate the body of the apparatus, and maintain either the shaft 18 stationary or the rotor 25 stationary. This application would be appropriate in certain conditions. Furthermore, while the device is shown rotating in a clockwise direction for both input and output shafts, it is possible to reverse direction because the apparatus is fully reversible. While the two rack pairs 90 and 91 are shown disposed at right angles to each other, the rack pairs can be repositioned so as to be disposed to each other at an angle other than a right angle. This would require a corresponding change in the angle between adjacent track surfaces 86 through 89 of the recess 84.

Also, the output rotor 25 is shown with a chain ring 27 driving a chain 28. Clearly spur gear teeth or other drive means to transmit power to or from other transmission means can be substituted.

I claim:

1. A power transmission apparatus having:
   (a) a body,
   (b) a pinion gear mounted for rotation about a pinion axis relative to the body,
   (c) a cam means having curved inner and outer surfaces, the cam means and the pinion gear being mounted for relative rotation therebetween,
   (d) inner and outer gear rack pairs, each gear rack pair having oppositely facing toothed rack portions which are spaced apart sufficiently to receive the pinion gear and cam means therebetween when the pinion gear fully engages teeth of at least one of the toothed rack portions and the outer surface of the cam means is adjacent at least one of the oppositely facing toothed rack portions, the toothed rack portions of each pair having oppositely disposed end portions,
   (e) resilient connecting means for interconnecting the end portions of each pair of toothed rack portions, so as to permit limited resilient movement between the toothed rack portions of each pair,
   (f) a rotor mounted for rotation about a rotor axis, the rotor having engaging means for sliding contact with the resilient connecting means of said first and second gear rack pairs, so as to transmit power therebetween.

2. A transmission as claim in claim 1 in which:
   (a) the resilient connecting means includes spring means extending between the opposed rack end portions of each rack portion so as to define a closed rack assembly.

3. A transmission as claimed in claim 2 in which:
(a) the resilient connecting means permits limited axial movement of each rack portion relative to an opposite rack portion of the gear rack pairs,
(b) stop means for limiting the said axial movement of each rack portion.

4. A transmission as claimed in claim 2 in which:
(a) each spring means includes a spring central portion, first and second spring end portions connected to opposed rack end portions, and first and second spring intermediate portions extending between the respective spring end portions and the spring central portion, the intermediate portions being shaped provide a controlled resilience.

5. A transmission as claimed in claim 1 further including:
(a) a pinion shaft mounting the pinion gear for mutual rotation about the pinion axis relative to the body,
(b) a cam mounting means cooperating with the pinion shaft and connected to the cam means so that the inner surface of the cam means is at a predetermined distance from the pinion gear axis, so as to permit teeth of the pinion gear to clear the inner surface of the cam means during relative rotation therebetween.

6. A transmission as claimed in claim 5 in which:
(a) the body includes inner and outer body sides which are spaced apart sufficiently to receive therebetween the first and second gear rack pairs, the cam means, the pinion gear and the rotor, the body sides engaging the rotor to permit relative movement therebetween, the body sides having aligned central openings to receive the pinion shaft therethrough.

7. A transmission as claimed in claim 5 further including:
(a) a gear ratio change means for varying spacing between the rotor axis and the pinion axis so as to vary gear ratio between the pinion shaft and the rotor,
(b) the gear ratio change means including a rotor mounting means which cooperates with the cam mounting means to permit relative movement between the cam mounting means and the rotor mounting member,
(c) the rotor being journalled on the rotor mounting means for relative rotation about the rotor axis.

8. An apparatus as claimed in claim 7 in which:
(a) the pinion axis is fixed,
(b) the rotor is moveable on the rotor mounting means to increase spacing between the rotor axis and the pinion axis so as to increase torque ratio of input torque which is applied to the pinion gear to output torque which is available from the rotor,
(c) the rotor mounting means is adapted to guide movement of the rotor as the said spacing increases to simultaneously reduce effective radius of action of the rotor to provide a favourable increase in torque in addition to the increase in torque ratio resulting from the change in spacing between the rotor axis and the pinion axis.

9. A transmission as claimed in claim 5 further including:
(a) a gear ratio change means for varying spacing between the rotor axis and the pinion axis so as to vary gear ratio between the pinion gear and the rotor, the gear ratio change means cooperating with the rotor and the pinion gear,
(b) a rotor mounting member mounted for movement along a cam axis passing through the pinion axis to vary spacing between the rotor axis and the pinion axis.

10. A transmission as claimed in claim 1 in which:
(a) the engaging means of the rotor include four track surfaces disposed as two pairs of oppositely disposed parallel surfaces forming a generally square configuration,
(b) the gear rack pairs being disposed at right angles to each other so that one rack pair extends between a respective pair of the oppositely disposed track surfaces, the connecting means of each gear rack pair engaging the adjacent track surface for movement therealong.

11. A transmission as claimed in claim 10 in which:
(a) the toothed rack portions of each gear rack pair have equal lengths,
(b) space between each pair of oppositely disposed surfaces is greater than the length of each toothed rack portion, so as to permit limited, generally axial movement of each toothed rack portion relative to the rotor.

12. A transmission as claimed in claim 11 in which:
(a) the resilient connecting means of each gear rack pair has a flexibility and shape sufficient to permit the limited generally axial movement of each rack portion until interference with an adjacent track surface prevents further movement, thus serving as a stop means for limiting the said axial movement of the rack portion.

13. A transmission as claimed in claim 1 in which:
(a) the rotor has an annular bearing surface concentric with the rotor axis,
and the transmission further includes:
(b) a rotor mounting surface complementary to the annular bearing surface of the rotor for mounting the rotor thereon, the rotor mounting means being non-rotatably located relative to the cam means.

14. A transmission as claimed in claim 13 in which:
(a) a cam mounting means cooperates with the cam means and is secured to the body,
(b) the pinion gear is mounted for rotation relative to the cam mounting means.

15. A transmission as claimed in claim 1 in which:
(a) the body includes inner and outer body sides, the body sides being spaced apart sufficiently to receive the rotor, the gear rack pairs, the cam means and the pinion gear therebetween, the body sides engaging outer portions of the rotor to permit relative movement therebetween.

16. A transmission as claimed in claim 15 further including:
(a) dynamic seal means provided between the body sides and outer portions of the rotor to accommodate the said relative movement.

17. A transmission as claimed in claim 1 further including:
(a) a gear ratio change means for varying spacing between the rotor axis and the pinion axis so as to vary gear ratio between the pinion gear and the rotor, the gear ratio change means cooperating with the rotor and the pinion gear.

18. A transmission as claimed in claim 17 in which:
(a) the pinion axis is fixed,
(b) the rotor is movable along a radius passing through the pinion axis.

19. An apparatus as claimed in claim 18 further comprising:
(a) means to mount and move the rotor in a particular direction so that increase in the spacing between the rotor axis and the pinion axis increases torque ratio of input torque which is applied the pinion gear to output torque which is available from the rotor,
(b) the said direction of movement of the rotor being selected to simultaneously reduce effective radius of action of the rotor to provide a favourable increase in torque available from the rotor in addition to the increase in torque ratio resulting from the change in spacing between the rotor axis and the pinion axis.

20. A transmission as claimed in claim 1 in which:
(a) the rotor has an outer periphery concentric with rotor axis, the outer periphery being provided with gear teeth for transmitting power between the rotor and other transmission means.

21. A power transmission apparatus having:
(a) an input drive means and an output drive means having respective input and output axes of rotation, the output drive means having a rotor having a radius of action relative to a particular axis of rotation,
(b) rack and pinion gear means cooperating with the input and output means to provide a variable gear ratio therebetween,
(c) gear ratio change means for varying spacing between the input axis and the output axis, the gear ratio change means cooperating with the input means and the output means to cause relative movement therebetween so that a signal to increase torque ratio of input torque which is applied to the input drive means to the output torque which is available from the output drive means moves the output drive means in such a direction as to provide a favourable reduction in effective radius of action of the output drive means thus increasing output torque, in addition to the said increase in torque ratio resulting from the rack and pinion gear means.

22. A transmission apparatus as claimed in claim 21 in which:
(a) the gear ratio change means cooperates with the rack and pinion gear means to increase spacing between the input and output axes of rotation to provide the said increase in torque ratio,
(b) the rotor of the output drive means has a rotor radius relative to the rotor axis,
(c) the gear ratio change means has a gear shift means for increasing output torque by reducing the effective radius of action of the output rotor relative to the input axis to a radius less than the rotor radius relative to the output axis.

23. A power transmission apparatus having:
(a) a body,
(b) a pinion gear mounted for rotation about a pinion axis relative to the body,
(c) a cam means having curved inner and outer surfaces, the cam means and the pinion gear being mounted for relative rotation therebetween,
(d) inner and outer gear rack pairs, each gear rack pair having oppositely facing toothed rack portions which are spaced apart sufficiently to receive the pinion gear and cam means therebetween when the pinion gear fully engages teeth of at least one of the toothed rack portions and the outer surface of the cam means is adjacent at least one of the oppositely facing toothed rack portions, the toothed rack portions of each pair having oppositely disposed end portions,
(e) resilient connecting means for interconnecting the end portions of each pair of toothed rack portions, so as to permit limited resilient movement between the rack portions of each pair,
(f) a rotor mounted for rotation about a rotor axis, the rotor having engaging means for cooperating with the first and second gear rack pairs, so as to transmit power therebetween,
(g) the engaging means of the rotor including four track surfaces disposed as two pairs of oppositely disposed parallel surfaces forming a generally square configuration,
(h) the gear rack pairs being disposed at right angles to each other so that one rack pair extends between a respective pair of the oppositely disposed track surfaces, the connecting means of each gear rack pair engaging the adjacent track surface for movement therealong.

24. A transmission as claimed in claim 23 in which:
(a) the toothed rack portions of each gear rack pair have equal lengths,
(b) space between each pair of oppositely disposed surfaces is greater than the length of each toothed rack portion, so as to permit limited, generally axial movement of each toothed rack portion relative to the rotor.

25. A transmission as claimed in claim 24 in which:
(a) the resilient connecting means of each gear rack pair has a flexibility and shape sufficient to permit the limited generally axial movement of each rack portion until interference with an adjacent track surface prevents further movement, thus serving as a stop means for limiting the said axial movement of the rack portion.

* * * * *